(12) United States Patent
Huang (10) Patent No.: US 7,670,132 B2
(45) Date of Patent: Mar. 2, 2010

(54) APPARATUS FOR INJECTION MOLDING

(75) Inventor: Chien-Feng Huang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 92 days.

(21) Appl. No.: 11/964,563

(22) Filed: Dec. 26, 2007

(65) Prior Publication Data
US 2008/0286405 A1    Nov. 20, 2008

(30) Foreign Application Priority Data
May 16, 2007    (CN) .................. 2007 1 0200622

(51) Int. Cl.
*B29C 45/42*    (2006.01)
(52) U.S. Cl. .................. 425/444; 425/436 R; 425/442; 425/556
(58) Field of Classification Search .......... 425/436 RM, 425/436 R, 438, 441, 442, 556, DIG. 51, 425/444
See application file for complete search history.

(56) References Cited

U.S. PATENT DOCUMENTS

| | | | | |
|---|---|---|---|---|
| 2,759,221 A * | 8/1956 | Edwards | ..................... | 425/140 |
| 3,776,675 A * | 12/1973 | Veneria | ..................... | 425/139 |
| 3,986,811 A * | 10/1976 | Gunnels, Jr. | ................. | 425/556 |
| 4,295,815 A * | 10/1981 | Eltvedt | ........................ | 425/556 |
| 4,719,059 A * | 1/1988 | Braun et al. | ................ | 264/40.1 |
| 4,741,687 A * | 5/1988 | Eltvedt | ........................ | 425/441 |
| 4,883,418 A * | 11/1989 | Hehl | .......................... | 425/217 |
| 4,946,357 A * | 8/1990 | Harrison | ...................... | 425/182 |
| 5,439,634 A * | 8/1995 | North | .......................... | 264/334 |
| 5,897,815 A * | 4/1999 | Quichaud et al. | ............. | 264/28 |
| 6,648,626 B1 * | 11/2003 | Eltvedt | ................... | 425/436 R |
| 6,971,867 B2 * | 12/2005 | Ihara et al. | ............... | 425/403.1 |
| 2004/0033286 A1 * | 2/2004 | Vanderploeg et al. | ........ | 425/444 |
| 2005/0208174 A1 * | 9/2005 | Hartley | ........................ | 425/556 |

* cited by examiner

*Primary Examiner*—Joseph S. Del Sole
*Assistant Examiner*—Emmanuel S Luk
(74) *Attorney, Agent, or Firm*—Clifford O. Chi (57) ABSTRACT

An injection molding apparatus includes a first mold half, a second mold half opposite to the first mold half, an eject pin, a component collector and a buffer device. The eject pin penetrates through the first mold half. The component collector is configured for receiving the molding component molded. The buffer device includes a buffer plate, a connection plate and an elastic element. The elastic element includes two elastic arms connected with each other. The two elastic arms form an angle θ in a range 0°<θ<180° in its natural state and partly inserting into the buffer plate and the connection plate respectively. The buffer device is disposed at a same side as the first mold half and the buffer plate is adjacent to the second mold half. The buffer device is configured for buffering the molding component during a knockout process.

9 Claims, 11 Drawing Sheets

APPARATUS FOR INJECTION MOLDING

CROSS-REFERENCE TO RELATED APPLICATIONS

This application claims all benefits accruing under 35 U.S.C. §119 from China Patent Application No. 200710200622.9, filed on May 16, 2007 in the China Intellectual Property Office, the disclosure of which is incorporated herein by reference.

BACKGROUND

1. Technical Field

The present invention relates to molding apparatuses and, more particularly, to an injection molding apparatus.

2. Description of Related Art

Molding apparatuses are widely used for manufacturing optical articles, such as light guide plates, lenses, and so on. Generally, a molding method using the molding apparatuses includes a knockout process.

Figure 11:
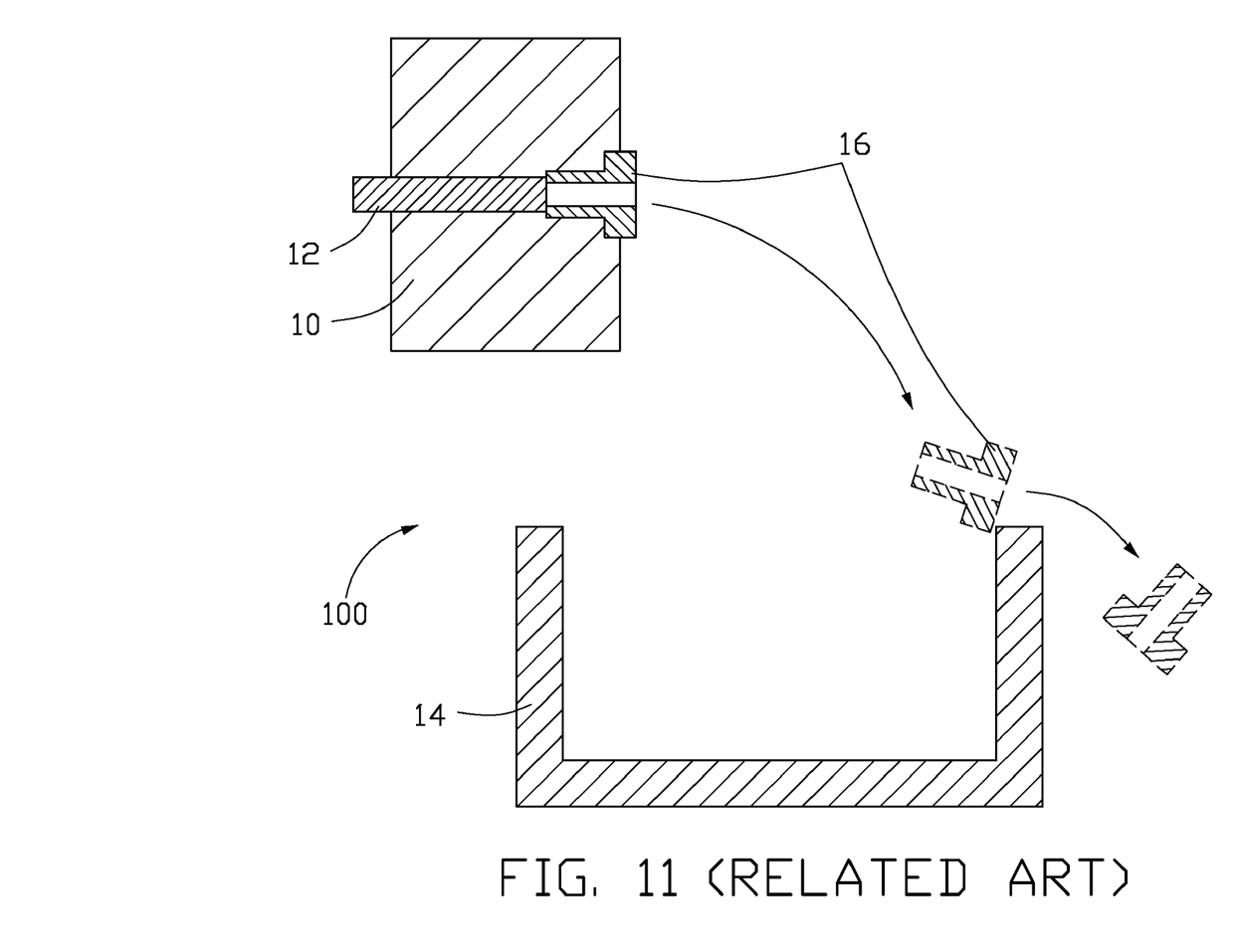

Referring to FIG. 11, an injection molding apparatus 100 includes a core 10, an eject pin 12 and a component collector 14. The core 10 defines a cavity 1022 therein. A molding component 16 is received in the cavity 1022. A through hole 1024 is defined in the core 10 and intercommunicates with the cavity 1022. The eject pin 12 passes through the through hole 1024 and touches the molding component 16 to eject the molding component 16 out of the cavity 1022. The component collector 14 is located at one side of and below the cavity 1022. The component collector 14 is configured for collecting the molding component 16 ejected out from the cavity 1022. A knockout process of the molding component 16 from the cavity 1022 using the eject pin 12 is described as below: firstly, the eject pin 12 moves towards the molding component 16 and knocks the molding component 16 out from the cavity 1022; then the molding component 16 falls into the component collector 14.

Figure 1:
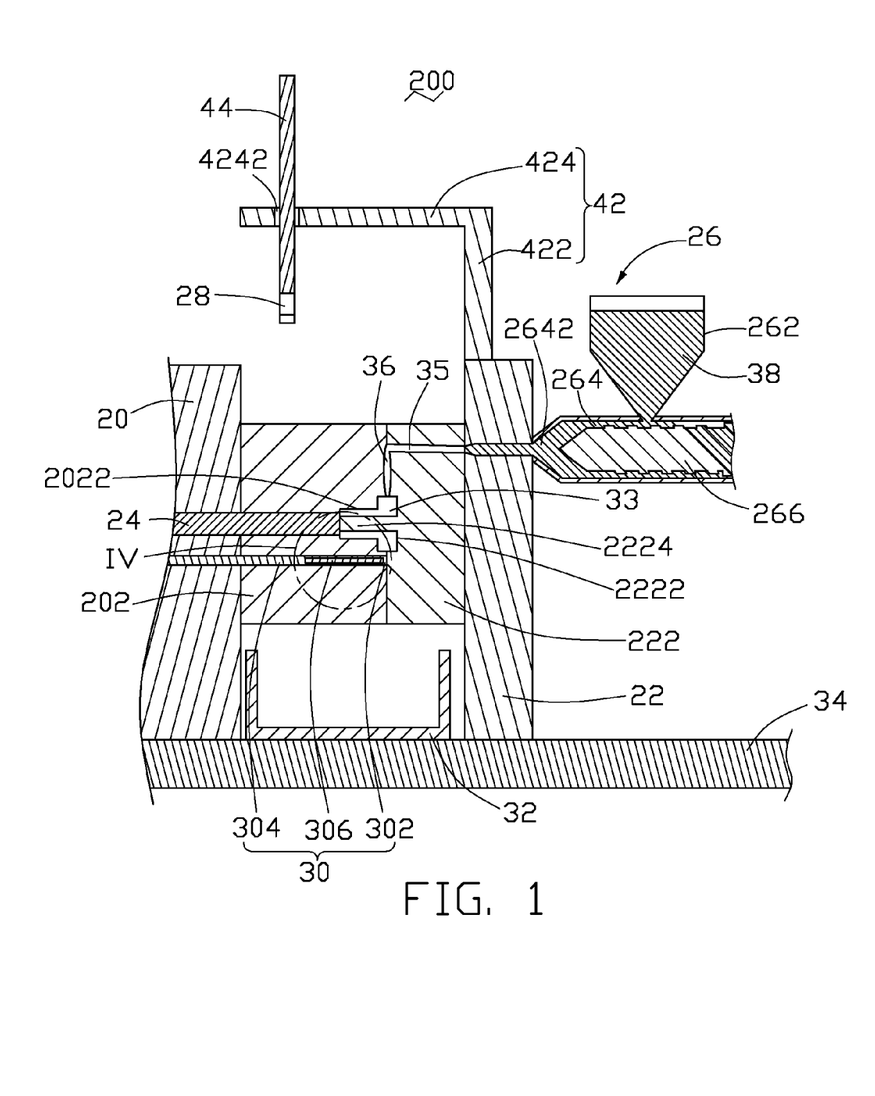
FIG. 1 is schematic, cross-sectional view of an injection molding apparatus according to a first embodiment of the present invention, wherein the injection molding apparatus includes a stub bar clamp and an elastic element, and a cavity is defined therein.

However, the molding component 16 may be ejected out with a large force that the molding component 16 may be disposed beyond the component collector 14 (see broken lines in FIG. 1). Sometimes, the molding component 16 may be broken because of that.

What is needed, therefore, is an injection molding apparatus can prevent the molding components from being broken.

SUMMARY

In a first present embodiment, an injection molding apparatus for injection molding a molding component includes a first mold half, a second mold half, an eject pin, a component collector and a buffer device. The second mold half is placed opposite to the first mold half. The eject pin penetrates through the first mold half. The component collector is placed below the first mold half and the second half. The component collector is configured for collecting the molding component. The buffer device includes a buffer plate, a connection plate and an elastic element. The elastic element includes two elastic arms connected with each other. The two elastic arms form an angle θ in a range of 0°<θ<180° in its natural state and partly inserting into the buffer plate and the connection plate respectively. The buffer plate is adjacent to the second mold half. The buffer device is configured for buffering the molding component during a knockout process.

In a second present embodiment of the present invention, an injection molding apparatus for injection molding a component includes a first mold half, a second mold half, an eject pin, a buffering plate, a driving member and an elongated spring member. The second mold half is disposed opposite to the first mold half. The first mold half and the second mold half cooperatively define a molding cavity for molding the component. The first mold half has a through opening beneath the molding cavity. The eject pin penetrates through the first mold half and extends to the molding cavity. The buffering plate is movable relative to the first mold half between a first position where the buffering plate is entirely received in the through opening and a second position where the buffering plate is located out of the through opening. The driving member is inserted in the through opening. The driving member is configured for driving the buffering plate to slidably move out of the through opening. The elongated spring member has a first end coupled to the driving member and an opposite second end coupled to the buffering plate. The elongated spring member is configured for deflecting the buffering plate to incline at an obtuse angle relative to the driving member when the buffering plate is in the second position.

Other advantages and novel features of the present invention will become more apparent from the following detailed description of present embodiment when taken in conjunction with the accompanying drawings.

BRIEF DESCRIPTION OF THE DRAWINGS

Many aspects of the present apparatus for injection molding can be better understood with reference to the following drawings. The components in the drawing are not necessarily drawn to scale, the emphasis instead being placed upon clearly illustrating the principles of the present apparatus for injection molding. Moreover, in the drawings, like reference numerals designate corresponding parts throughout the several views.

DETAILED DESCRIPTION OF THE PRESENT EMBODIMENTS

Embodiments of the present injection apparatus for injection molding will now be described in detail below and with reference to the drawings.

Figure 2:
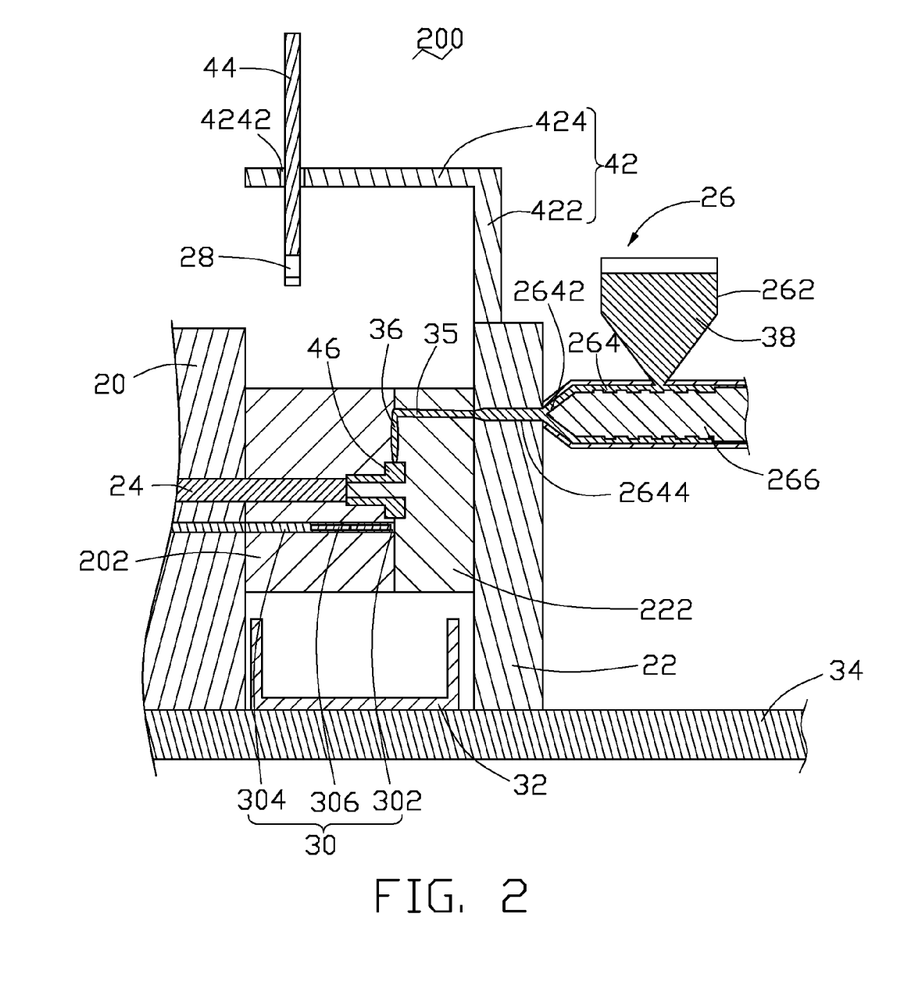
FIG. 2 is schematic, cross-sectional view of the injection molding apparatus in FIG. 1 with the cavity filled with injection material.

Referring to FIGS. 1 and 2, an injection molding apparatus 200 according to a first embodiment is shown. The injection molding apparatus 200 is used for injection molding a component 46. In the present embodiment, the molding component 46 is a lens barrel for use in a camera. Alternatively, the molding component 46 could be a lens holder, a mobile phone shell, etc. The injection molding apparatus 200 includes a movable platen 20, a stationary platen 22 and an eject pin 24. The movable platen 20 and the stationary platen 22 are placed on a work table 34 and can slide on the work table 34. A first mold half 202 and a second mold half 222 are attached to the movable platen 20 and the stationary platen 22 respectively. The first mold half 202 is opposite to the second mold half 222.

The first mold half 202 has a first molding surface 2022. The second mold half 222 has a second molding surface 2222. A post-shaped core 2224 protrudes from the second molding surface 2222. The first molding surface 2022, the second molding surface 2222 and the post-shaped core 2224 cooperatively define a molding cavity 33. The eject pin 24 penetrates through the first mold half 2022. A distal end of the eject pin 24 touches the post-shaped core 2224. A diameter of the side surface of the eject pin 24 is larger than that of the post-shaped core 2224. The injection molding apparatus 200 further includes an eject pin driver (not shown) for driving the eject pin 24.

A main runner 35 is defined in the second mold half 222. A branch runner 36 is formed between the first mold half 202 and the second mold half 222. The branch runner 36 is in flow communication with the main runner 35 and the molding cavity 33.

The injection molding apparatus 200 further includes an injection unit 26, a support stand 42, a stub bar clamp 28, a buffer device 30, and a component collector 32. The injection unit 26 is a screw type injection unit. The injection unit 26 includes a hopper 262, a material passageway 264 and a screw type auger 266. The hopper 262 is configured for supplying injection material 38 for forming the molding component 46. The material passageway 264 is in flow communication with the hopper 262. The material passageway 264 defines a buffer storage area 2642 at one end thereof. The buffer storage area 2642 communicates with the main runner 35 through a sprue 2644. The screw type auger 266 is received in the material passageway 264 and can be driven to move along the passageway 264. Also, the screw type auger 266 can spin in the material passageway 264.

The support stand 42 includes a support 422 and a crossbeam 424. The support 422 is integrally connected with and perpendicular to the crossbeam 424. One end of the support 422 is fixed on the stationary platen 22. The support 422 is perpendicular to a top surface of the stationary platen 22. The crossbeam 424 defines a through hole 4242 therein along a direction perpendicular to the crossbeam 424. A driving pole 44 passes through the through hole 4242. The driving pole 44 is driven by a pole driver (not shown) to slide along the through hole 4242. Alternatively, the support 422 can incline to the top surface of the stationary platen 22. The support 422 can be attached to the movable platen 22, work table 34, etc.

Figure 3:
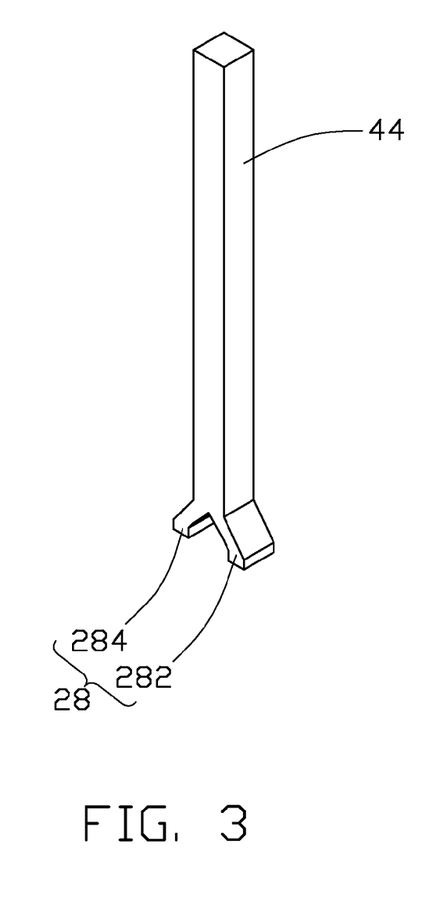
FIG. 3 is schematic, isometric view of the stub bar clamp of the injection molding apparatus in FIG. 1.

With reference to FIG. 3, the stub bar clamp 28 is used for removing the stub bar (see stub bar 40 in FIG. 7) and disposing the stub bar into a waste material collecting case (not shown). The stub bar clamp 28 is a clamp formed by two clamp portions 282 and 284. The two ends portions of the stub bar clamp 28 respectively connect with the driving pole 44. Thus, the stub bar clamp 28 can be driven by the driving pole 44. The two clamp portions 282 and 284 form a "V" shape for the convenience of clamping the sub bar. A material for making the stub bar clamp 28 can be selected from a group consisting of stainless steel, aluminum alloy and other rigid materials.

Figure 4:
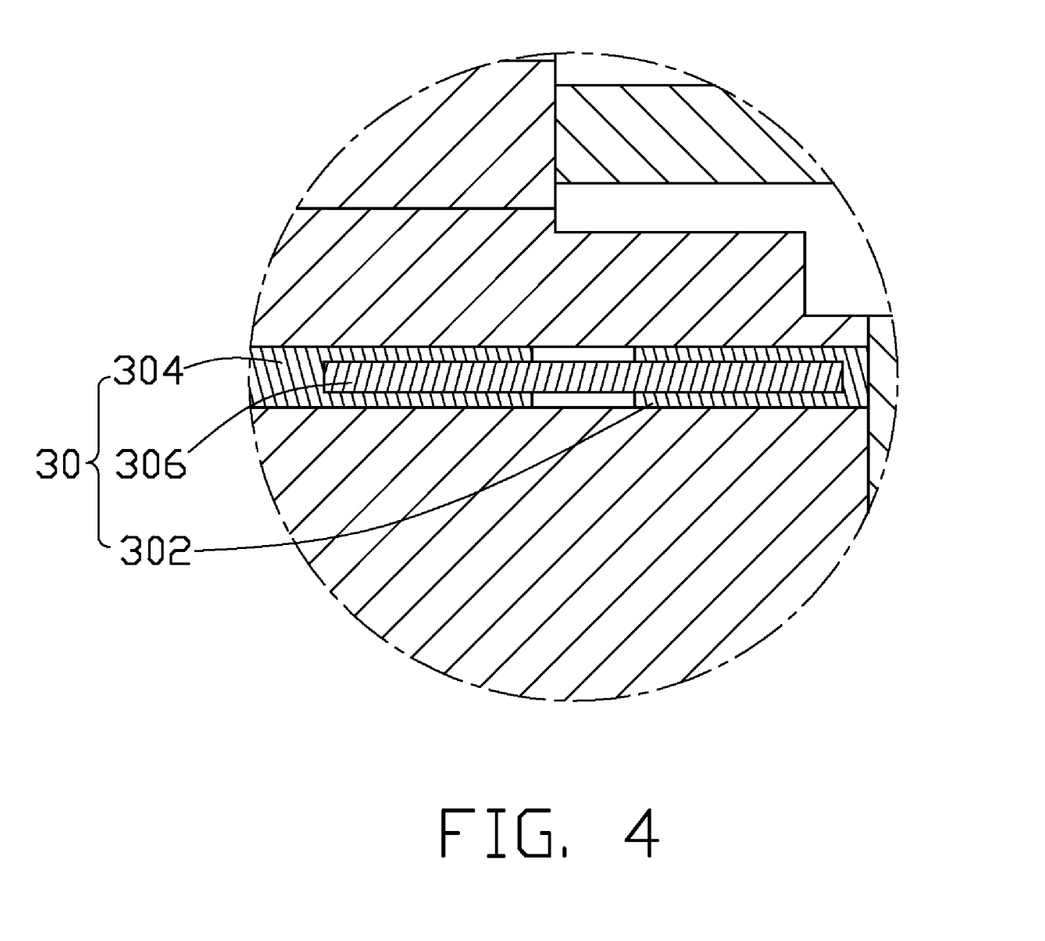
FIG. 4 is enlarged view of a circled portion IV of FIG. 1, showing the structure of a buffer device.
Figure 5:
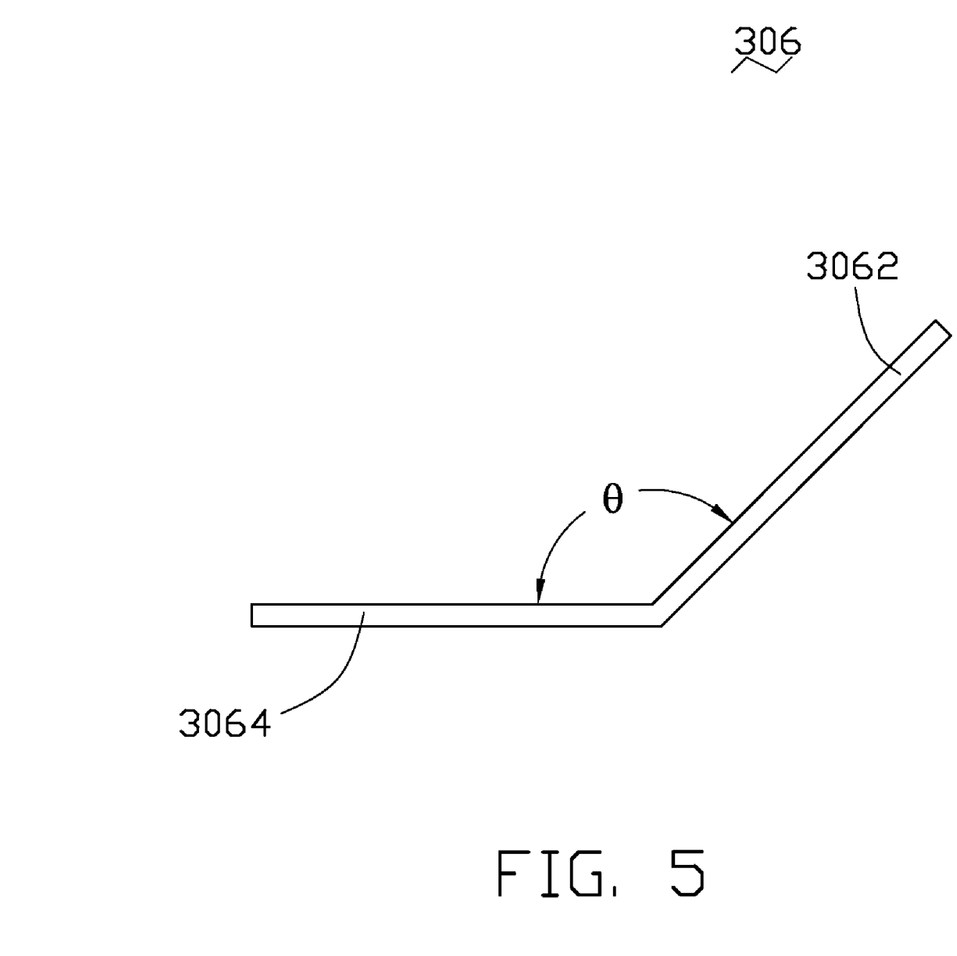
FIG. 5 is schematic, side view of the elastic element of injection molding apparatus in FIG. 1.

With reference to FIG. 4, The buffer device 30 includes a buffer plate 302, a connection plate 304 and an elastic element 306. The buffer device 30 is configured for buffering the lens barrel 46 when the lens barrel 46 is ejected out from the first mold half 202. Referring to FIG. 5, the elastic element 306 is shown in its natural state. The elastic element 306 includes two elastic arms 3062 and 3064 integrally connected to each other. The elastic arms 3062 and 3064 form an angle θ which is in a range $0° < θ < 180°$, and preferably in a range $90° < θ < 150°$. One end of the elastic arm 3062 and that of the elastic arm 3064 are partly inserted into the buffer plate 302 and the connection plate 304 respectively. The elastic element 306 may be selected from a group consisting of a flat spring, a torque spring, etc. In the present embodiment, the elastic element 306 is a flat spring.

Figure 8:
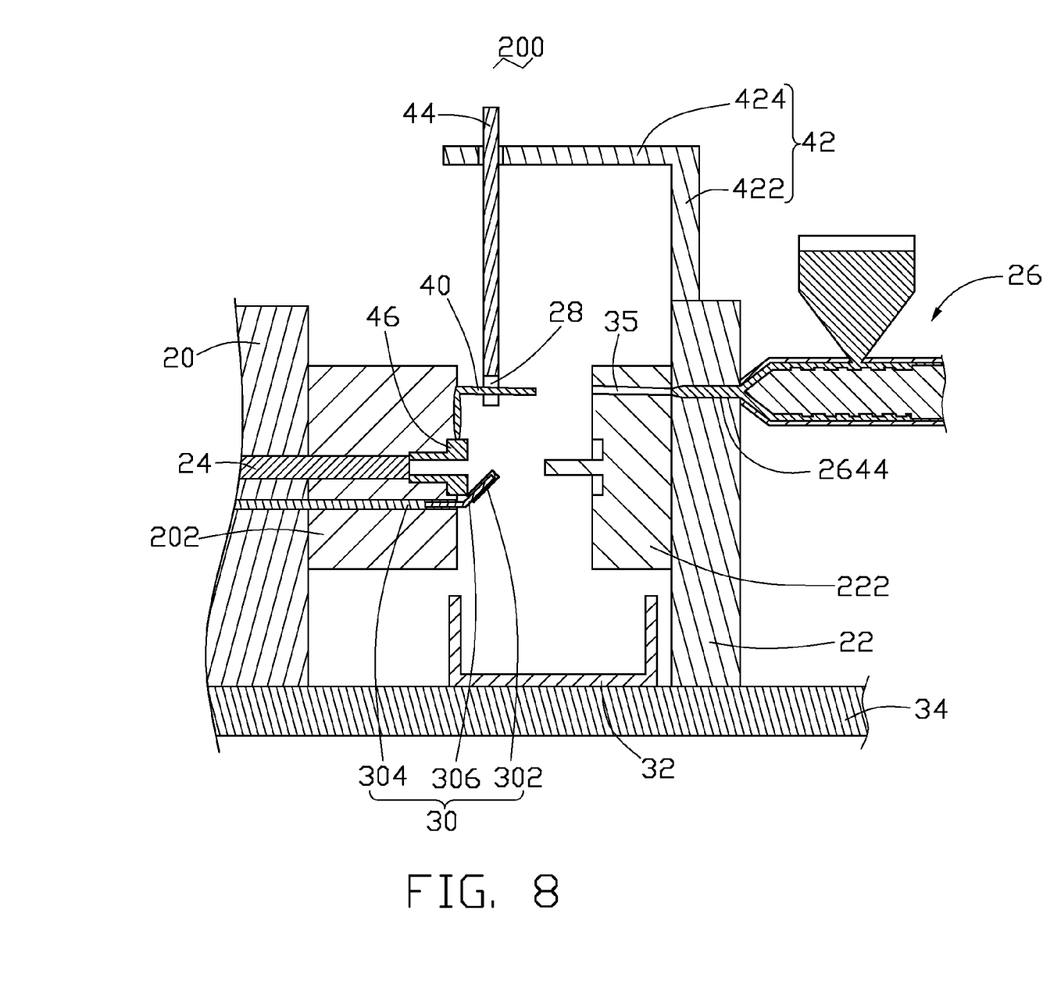
FIG. 8 is schematic, cross-sectional view of the injection molding apparatus of FIG. 1 when the stub bar clamp is cropping a stub bar.

The buffer device 30 penetrates through the movable platen 20 and the first mold half 202. In the present embodiment, the buffer device is located beneath the molding cavity 33. When the buffer device 30 is received in the first stationary platen 20 and the first mold half 202, an angle which the elastic arm 3062 tilts with respect to the elastic arm 3064 is approximately 180°. So the buffer device 30 is approximately parallel with the eject pin 24. The buffer plate 302 is located adjacent to the second mold half 222. The connection 304 is located away from the second mold half 222. The buffer device 30 can move along a direction parallel to the eject pin 24. Referring to FIG. 2, when the injection molding apparatus 200 locked, the whole buffer plate 302 is in the first mold half 202. Referring to FIG. 8, when the injection molding apparatus 200 is unloaded, the buffer plate 302 moves out of the first mold half 202. Due to the elasticity of the elastic element 306, the buffer plate 302 and the connection plate 304 form an angle γ smaller than the angle θ. The buffer plate 302 bends towards the lens barrel 46.

The component collector 32 is a box-like collector with an opening defined therein. A material for making the component collector 32 can be selected from a group consisting of plastic, aluminum alloy, iron, etc. The component collector 32 is placed at one side of and below the second mold half 222. The component collector 32 is used for collecting the lens barrel 46 after the lens barrel 46 is ejected out of the first mold half 202.

The injection molding apparatus 200 also can be a multi-cavity injection molding apparatus which can mold a plurality of lens barrels 46 at a time. Correspondingly, a plurality of branch runners is required to communicate the main runner 35 with the branch mold cavities.

Figure 6:
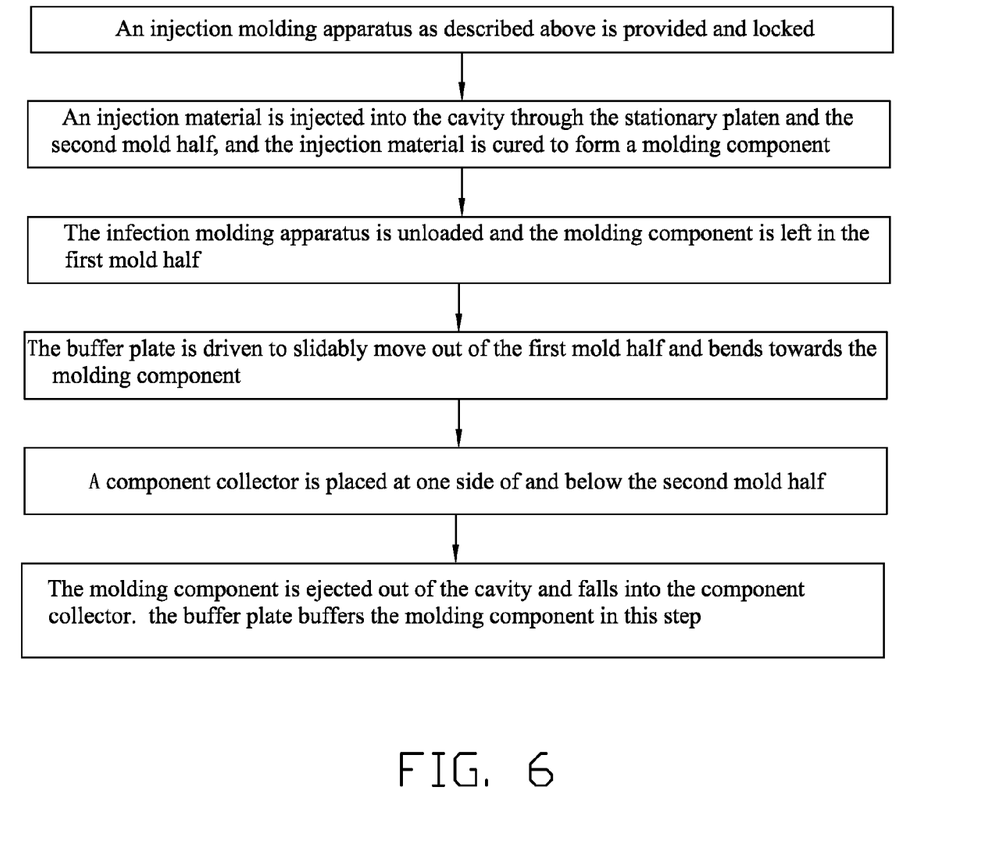
FIG. 6 is a flow chart of an injection molding method using the injection molding apparatus of FIG. 1 according to a second embodiment.

Referring to FIG. 6, an injection molding method using the injection molding apparatus 200 includes following steps:

Step 1: an injection molding apparatus as described above is provided and locked.

Step 2: an injection material is injected into the cavity through the stationary platen and the second mold half, and the injection material is cured to form a molding component.

Step 3: the injection molding apparatus is unloaded and the molding component is left in the first mold half.

Step 4: the buffer plate is driven to slidably move out of the first mold half and bends towards the molding component.

Step 5: a component collector is placed at one side of and below the second mold half.

Step 6: the molding component is ejected out of the cavity and falls into the component collector. The buffer plate buffers the molding component in this step.

Referring to FIGS. 1 to 5, and 7 to 9, the injection molding method using the injection molding apparatus 200 is described in detail as follows.

Referring to FIG. 1, in step 1, the molding apparatus 200 includes a movable platen 20, a stationary platen 22, a first mold half 202, a second mold half 222, and a buffer device 30. The first mold half 202 and the second mold half 222 are attached to the movable platen 20 and the stationary platen 22 respectively. The first mold half 202 cooperates with the second mold half 222 to form a molding 33 cavity therebetween. The buffer device 30 includes a buffer plate 302, a connection plate 304 and an elastic element 306. The elastic element 306 includes two elastic arms 3062 and 3064 forming an angle θ in a range 0°<θ<180° when the elastic element 306 is in its natural state. The two elastic arms 3062 and 3064 are partly inserted into the buffer plate 302 and the connection plate 304 respectively. The buffer plate 302 is close to the second mold half 222.

In step 2, the screw type auger 266 in the material passageway 264 spins to feed the injection material 38 to the buffer storage area 2642. There is a distance between the end of the screw type auger 266 and the hopper 262.

Referring to FIG. 2, the screw type auger 266 is driven towards the buffer storage area 2642. Thus the injection material 38 in the buffer storage area 2642 is injected into the molding cavity 33 through the main runner 35 and the branch runner 36. Then the molding cavity 33 is filled with the injection material 38.

The injection material 38 in the molding cavity 33 is cured by cooling, thus a molding component 46 is molded. The injection material 38 in the main runner 35 and the branch runner 36 are cured to form a stub bar 40.

Figure 7:
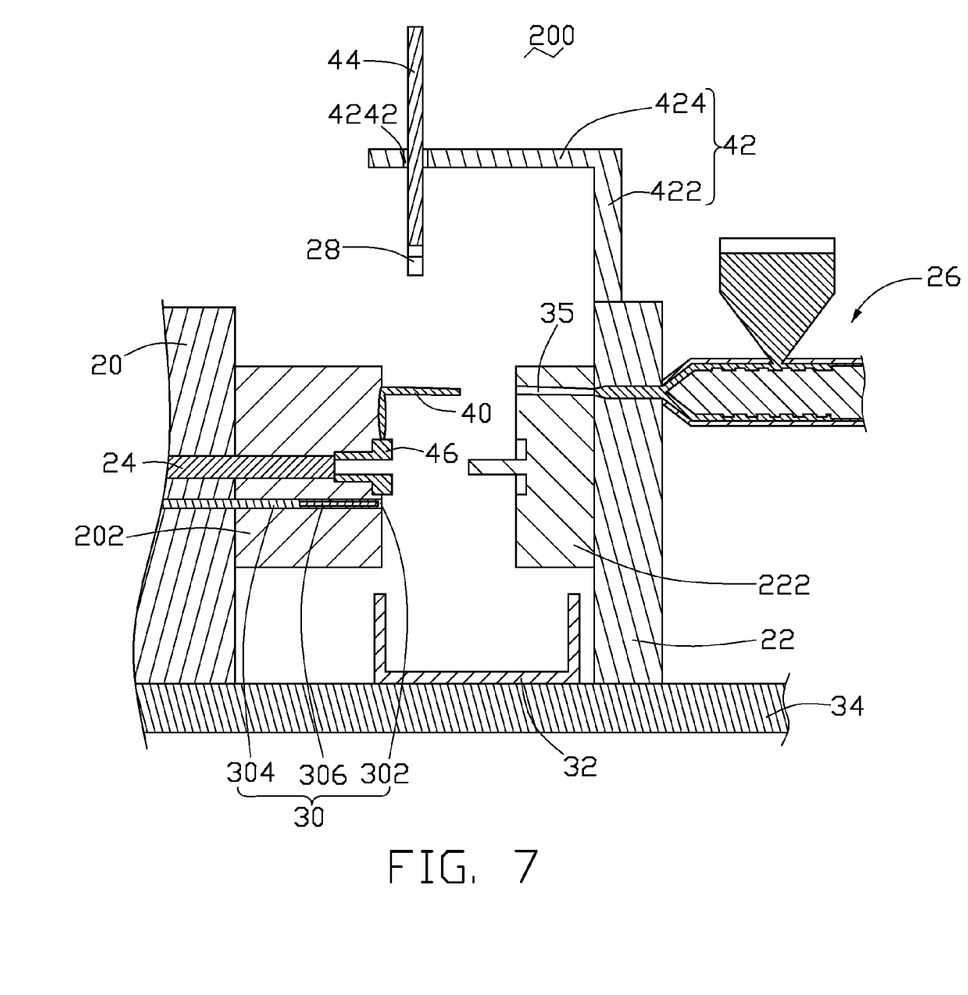
FIG. 7 is schematic, cross-sectional view of the injection molding apparatus of FIG. 1 in an unloading mold state.
Figure 9:
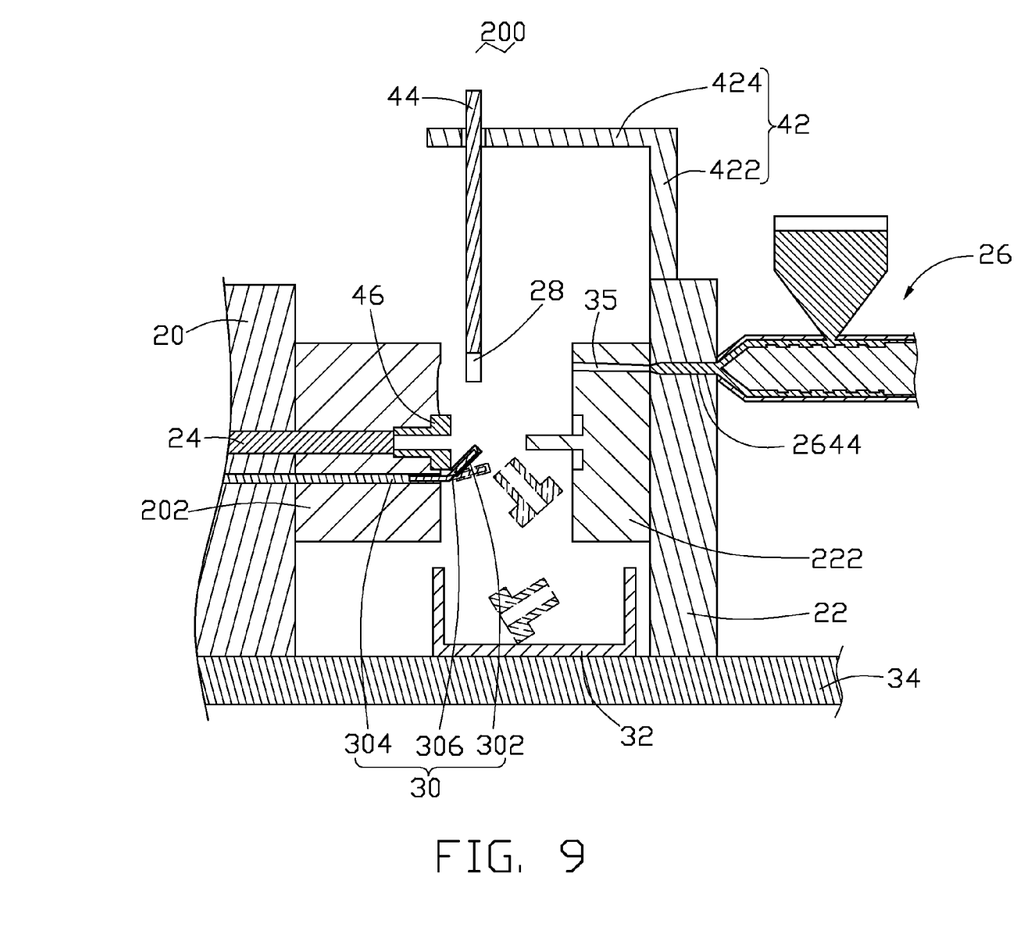
FIG. 9 is schematic, cross-sectional view of a knockout process of the injection molding method of FIG. 5.

Referring to FIG. 7, in step 3, the injection molding apparatus 200 is unloaded. The first mold half 202 moves away from the second mold half 222. The molding component 46 is left in the first mold half 202. The stub bar 40 is connected with the molding component 46. Referring to FIGS. 3, 8 and 9, the stub bar clamp 28 is driven by the driving pole 44 to crop the stub bar 40. The stub bar 40 is then cropped and disconnected from the molding component 46 by the stub bar clamp 28 and disposed to the waste material collecting case.

In step 4, The buffer plate 302 of the buffer device 30 is driven to slide out of the first mold half 202 and bends towards the molding component 46. In step 5, a component collector 32 is placed at one side of and below the second mold half 222.

In step 6, the molding component 46 is ejected out of the first mold half 202 by the eject pin 24 and falls into the component collector 32. The buffer plate 302 buffers the molding component 46 in this step.

In the injection molding method, the injection apparatus 200 can also be an injection molding apparatus without stub bars. Accordingly, the step of cropping the stub bar 40 can be omitted. In addition, the screw type auger 266 can also be replaced by a plunger type auger, not limited to the present embodiment.

One of advantages of the injection molding method is to prevent the molding component 46 from being disposed beyond the component collector 32 during the knockout process. Thus, decrease the chances of breaking the molding component 46.

Figure 10:
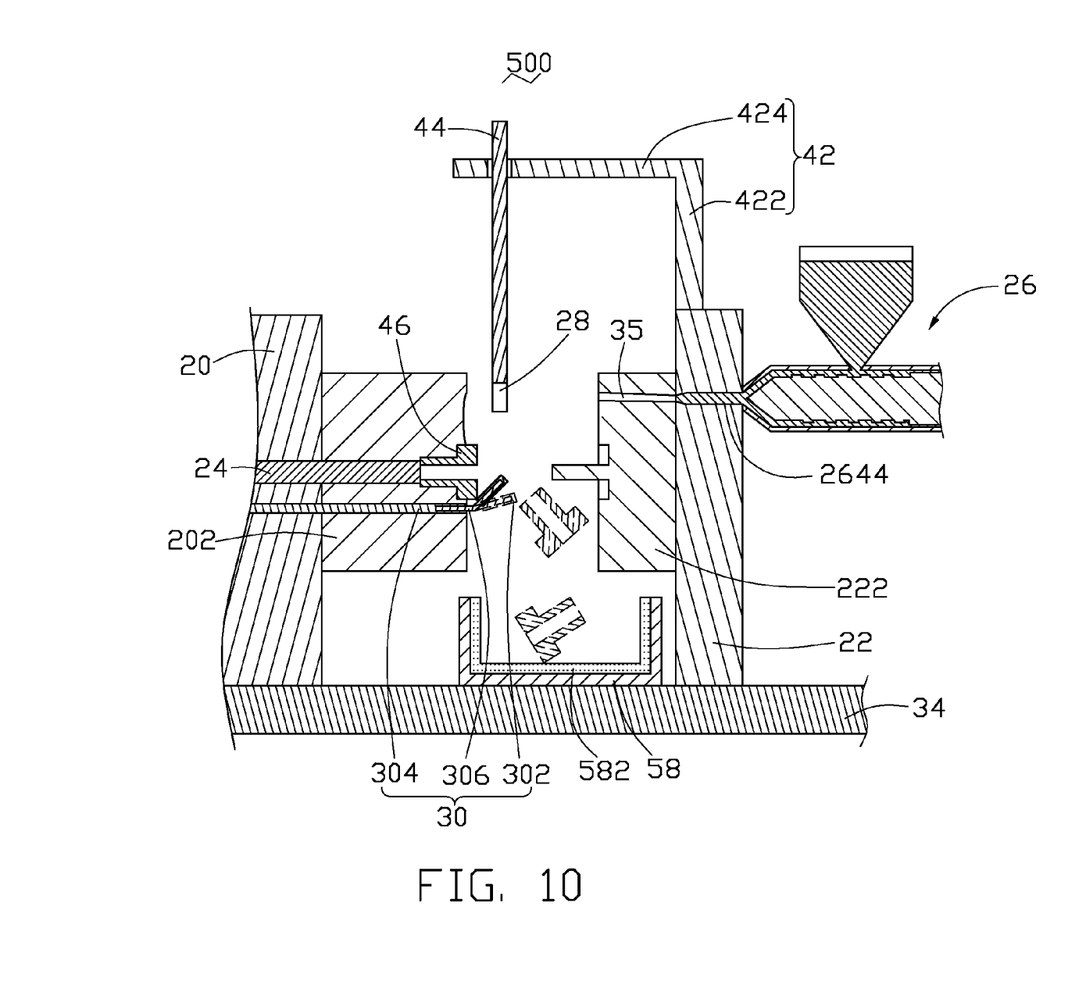
FIG. 10 is schematic, cross-sectional view of another injection molding apparatus according to a third embodiment.

Referring to FIG. 10, another injection molding apparatus 500 is illustrated in accordance to the third embodiment. The injection molding apparatus 500 is similar to the injection molding apparatus 200. The difference between the two injection molding apparatuses 500 and 200 is that the injection molding apparatus 500 includes a component collector 58 with a buffer layer 582 formed on the interior surface thereof. A material of the buffer layer 582 can be selected from plastic foam, rubber foam, cotton, cloth, silica gel, etc.

It is understood that the above-described embodiment are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. An injection molding apparatus for injection molding a component, comprising:
   a first mold half;
   a second mold half opposite to the first mold half, the first mold half and the second mold half cooperatively defining a molding cavity for molding the component, the first mold half having a through opening beneath the molding cavity;
   an eject pin penetrating through the first mold half and extending to the molding cavity;
   a buffering plate movable relative to the first mold half between a first position where the buffering plate is entirely received in the through opening and a second position where the buffering plate is located out of the through opening;
   a driving member inserted in the through opening, the driving member being configured for driving the buffering plate to slidably move out of the through opening; and
   an elongated spring member having a first end coupled to the driving member and an opposite second end coupled to the buffering plate, the elongated spring member being configured for deflecting the buffering plate to incline at an obtuse angle relative to the driving member when the buffering plate is in the second position.

2. The injection molding apparatus as described in claim 1, wherein the obtuse angle is in a range of 90°<θ<150°.

3. The injection molding apparatus as described in claim 1, further comprising a component collector placed below the first mold half and the second half, the component collector being configured for collecting the molding component.

4. The injection molding apparatus as described in claim 3, wherein the component collector comprises a buffer layer formed on an interior surface thereof.

5. The injection molding apparatus as described in claim 4, wherein a material of the buffer layer is selected from plastic foam, rubber foam, cotton, cloth, or silica gel.

6. The injection molding apparatus as described in claim 1, further comprising a stub bar clamp, the stub bar clamp vertically movable relative to the molding cavity, the stub bar clamp being configured for removing a stub bar connecting with the component.

7. The injection molding apparatus as described in claim 6, further comprising a support stand and a driving pole, the support stand being fixed on the second mold half for supporting the driving pole, the driving pole being installed with the support stand and vertically movable relative to the molding cavity, the stub bar clamp being fixed on one distal end of the driving pole.

8. The injection molding apparatus as described in claim 7, wherein the support stand comprises a support and a crossbeam integrally connected with the support, the support being arranged vertically and being perpendicular to the crossbeam, the crossbeam defining a through hole therein along a vertical direction, the driving pole passing through the through hole and vertically movable through the through hole.

9. The injection molding apparatus as described in claim 1, wherein the elongated spring member is selected from the group consisting of a flat spring and a torque spring.

* * * * *